I. WOODRING.
FEEDING DEVICE FOR CORN HUSKING MACHINES.
APPLICATION FILED MAY 12, 1913.
1,077,899.
Patented Nov. 4, 1913.
3 SHEETS—SHEET 1.
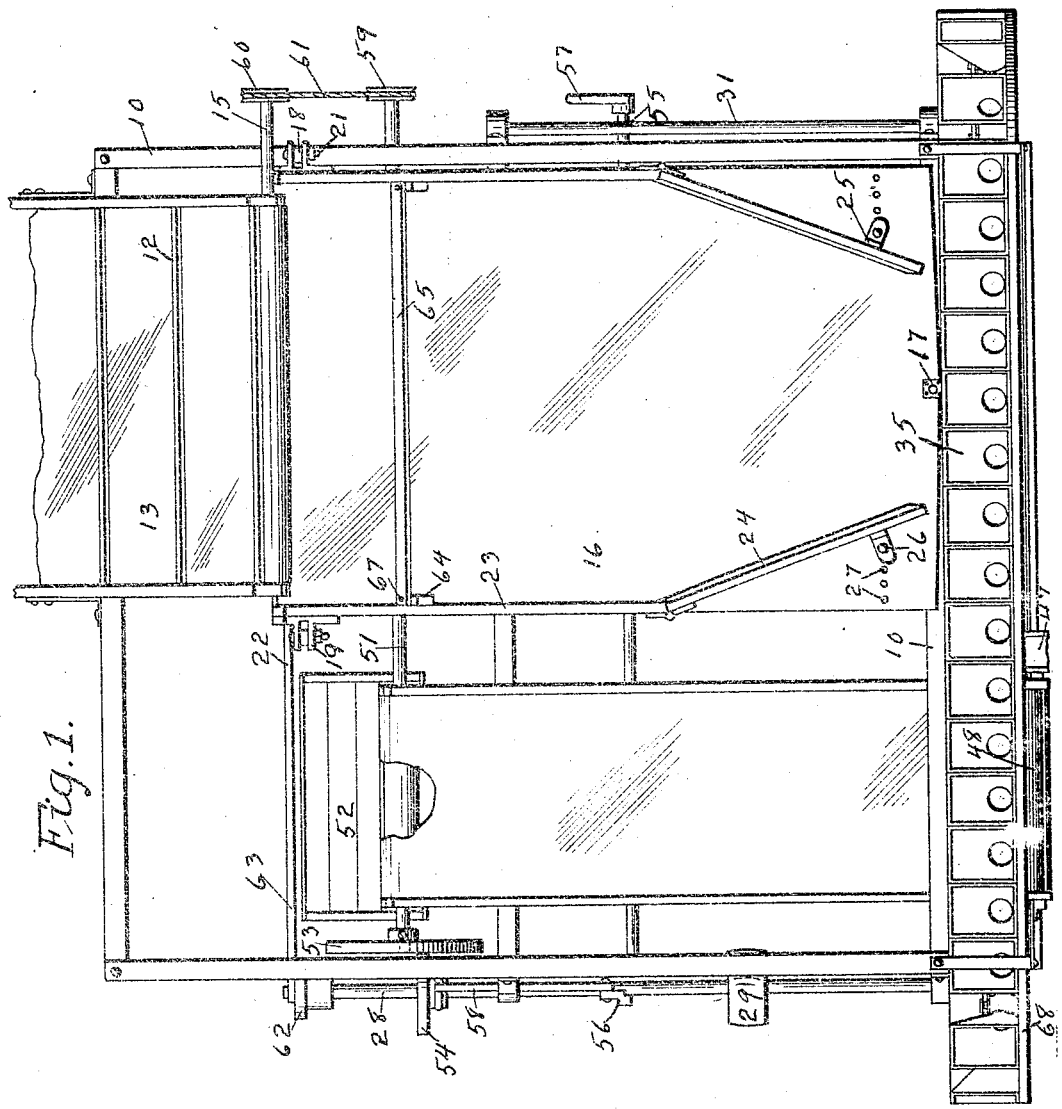
Witnesses
Inventor.
Isaac Woodring
by Orwig & Bair Atty's.

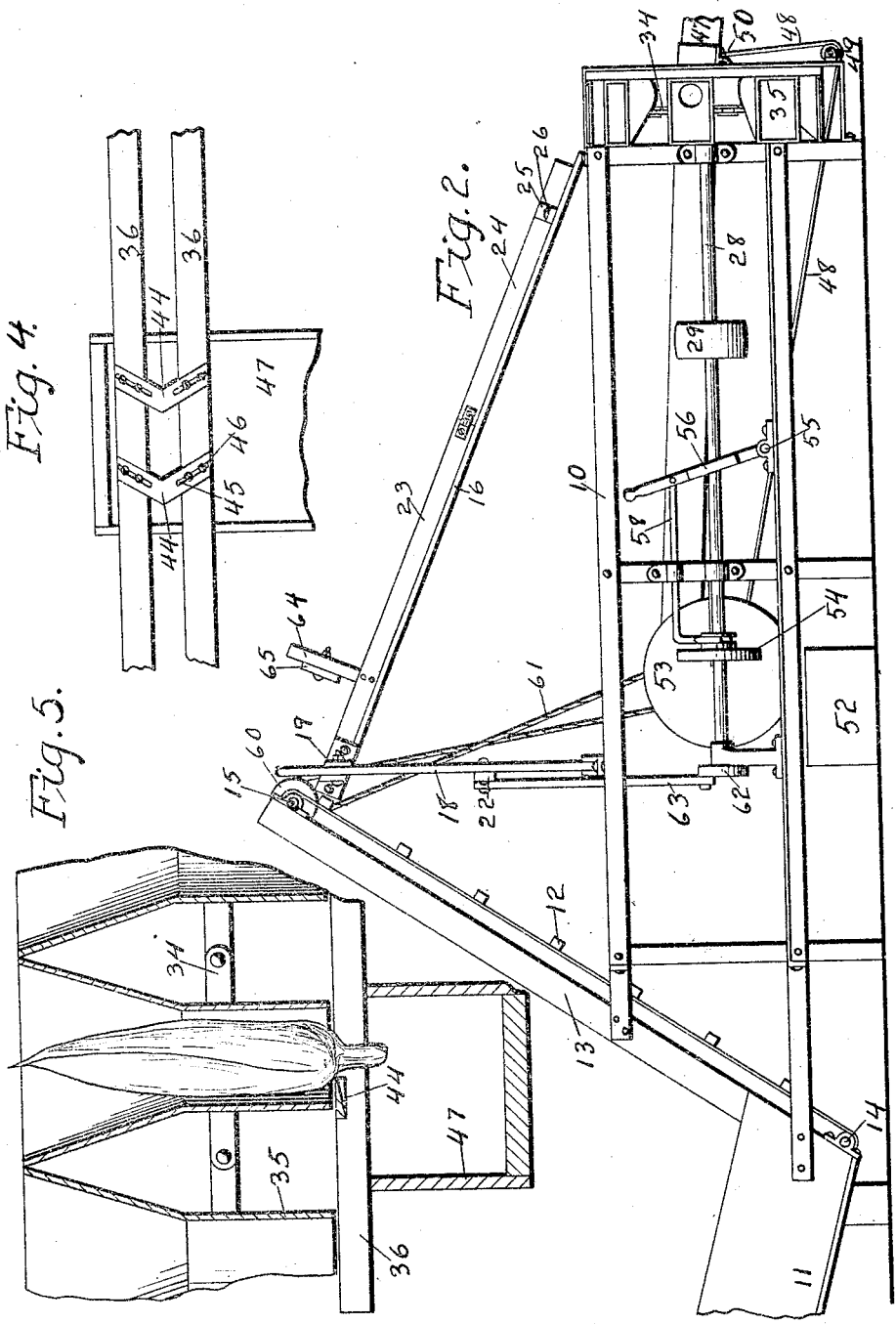

I. WOODRING.
FEEDING DEVICE FOR CORN HUSKING MACHINES.
APPLICATION FILED MAY 12, 1913.
1,077,899.
Patented Nov. 4, 1913.
3 SHEETS—SHEET 3.
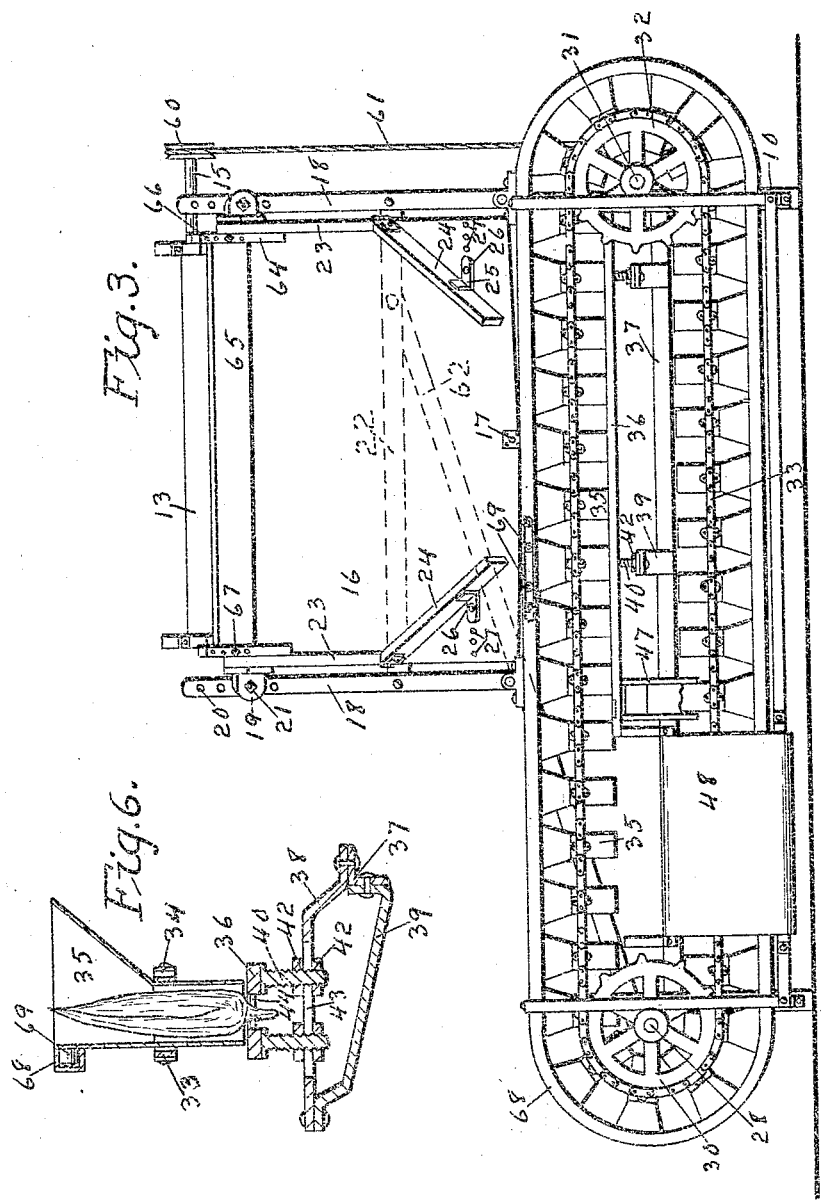
Witnesses
C. A. Paley
A. G. Hague
Inventor.
Isaac Woodring.
by Orwig & Bair Atty's.

UNITED STATES PATENT OFFICE.

ISAAC WOODRING, OF WAVERLY, IOWA.

FEEDING DEVICE FOR CORN-HUSKING MACHINES.

1,077,899.  Specification of Letters Patent.  Patented Nov. 4, 1913.

Application filed May 12, 1913. Serial No. 767,226.

*To all whom it may concern:*

Be it known that I, ISAAC WOODRING, a citizen of the United States, and resident of Waverly, in the county of Bremer and State of Iowa, have invented a new and useful Feeding Device for Corn-Husking Machines, of which the following is a specification.

The object of my invention is to provide a feeding device for corn husking machines particularly designed for use in canning factories.

More particularly, it is my object to provide such a device whereby corn which has been removed from the stalks and on which the husks have been left may properly be fed to mechanism for cutting off the butts of the husks.

A further object is to provide a machine of the class mentioned, provided with mechanism whereby the unhusked corn is fed into proper receptacles on a traveling conveyer and then maintained in suitable position and carried past belts which cut off the butts of the husks and cobs.

Still a further object is to provide in such a machine mechanism for regulating the speed at which the corn is fed to the traveling conveyer.

My invention consists in certain details, in the construction, combination and arrangement of the various parts of the device whereby the objects contemplated are attained, as hereinafter more fully set forth, pointed out in my claims and illustrated in the accompanying drawings, in which—

Figure 1 shows a top or plan view of a feeding device for corn husking machines, embodying my invention. Fig. 2 shows a side elevation of the same. Fig. 3 shows a front elevation of said machine. Fig. 4 shows a detail, plan view of a portion of the bars or slots which support the cutting blades. Fig. 5 shows a detail, sectional view of a portion of the conveyer, showing the contraction of the corn receptacles, and Fig. 6 shows a detail, sectional view of a portion of said conveyer and of said slots or bars, illustrating the manner in which said bars are adjusted.

In the accompanying drawings I have used the reference numeral 10 to indicate generally the frame of my improved machine. Mounted at the rear of the frame is a receptacle 11 and adjacent thereto is a traveling conveyer 12. The traveling conveyer 12 is mounted in a suitable frame 13 having at its lower end a shaft 14 and at its upper end a shaft 15 on which the conveyer 12 travels. Extending downwardly and forwardly in the machine from the upper end of the frame 13 is a platform 16 which is pivotally mounted in the middle of its forward end at 17. Upright members 18 are pivoted to the frame 10 and extend upwardly and are pivoted at their upper ends to the respective sides of the upper end of the platform 16. On the platform 16 I provide brackets 19 and in the arms 18 I provide a plurality of holes 20 to selectively receive bolts 21 which are extended through the brackets 19 for pivotally securing the arms 18 to the platform 16. Connecting the arms 18, near their centers, is a horizontal bar 22, each end of which is pivoted to one of the arms 18.

It will be noted that by moving the bar 22 longitudinally, the platform 16 may be vibrated from side to side. At the sides of the platform 16 are side boards or walls 23 which extend from the top approximately to the middle of the platform 16. Hinged to the lower ends of the side boards 23 are movable side boards 24. Secured to the side boards 24 are short angle irons 25 designed to be secured in various positions of the platform 16 by means of bolts 26 selectively received in holes 27 in said platform. Mounted on the frame 10 is a shaft 28 on which is a belt wheel 29 or other means whereby the shaft 28 may be rotated from a suitable source of power. On the shaft 28, at the front end of the machine, are sprocket wheels 30. The shaft 28 may be located on the left hand side of the machine, as shown in Fig. 3. At the other side of the machine is a short parallel idler shaft 31 on which are sprocket wheels 32, in line with the sprocket wheels 30. Sprocket chains 33 and 34 travel on the wheels 30 and 32. Mounted between the sprocket chains 33 and 34 are a plurality of buckets 35 which with the chains and the other parts mentioned constitute a traveling conveyer for carrying ears of corn. The side walls of the buckets 35 on the side away from the platform 16 are substantially vertical. The upper ends of said side walls, on the other three sides, are flared or inclined outwardly, as shown in Figs. 5 and 6. The chains 33 and 34 are secured to the sides of the buckets 35 approximately midway between their tops and bottoms, as clearly shown in Figs. 3, 5 and 6. The chains 33 and 34 and the buckets 35 are so located that the upper ends of said buckets travel below the lower end of the platform 16 for receiving ears of corn discharged from said platform.

It will be seen that the chains 33 and 34 are of sufficient length to carry corn considerably beyond the platform 16. Located in front of the platform 16 and just below the buckets on the upper part of the chains are parallel guide strips or boards 36 which are mounted on the frame of the machine in the following manner.

Near the front end of the machine is a transverse angle iron 37 to which are secured a plurality of brackets 38 which are partially supported by braces 39. The brackets 38 are provided with screw threaded openings to receive the screw threaded bolts 40, the slots of which are firmly secured to the guide bars 36. On the bolts 40, above and below the brackets 38, are nuts 42. The brackets 38 are provided with slots 43.

It will be seen that by loosening the nuts 42, the position of the bolts 40 in the slots 43 may be changed so that the space between the parallel guide bars 36 may be varied. The guide bars 36 extend slightly beyond the lower end of the platform 16, as shown in Fig. 3. Secured to the guide bars 36, near their left hand ends, as shown in Fig. 4, are one or more knives or blades 44, having substantially the shape of a V with the sharp cutting edge in the notch of the V. The arms of the blades 44 are provided with slots 45 to receive bolts 46 whereby the blades are secured to the bars 36. By loosening the bolts 46, the bars 36 may be adjusted as hereinbefore set forth to vary the distance between them. Beneath the knife blades 44 is a discharge chute 47. Adjacent to the delivery ends of the guide bars 36 is a traveling conveyer 48 which travels over rollers or shafts 49, 50 and 51.

The upper portion of the traveling conveyer 48 travels from position below the delivery ends of the guide bars 36 rearwardly in the machine and discharges above a receptacle 52. On the shaft 51 is a friction disk 53 and slidably mounted on the shaft 28 is a friction wheel 54 designed to engage the disk 53. Mounted on the frame of the machine is a transverse shaft 55. Secured to the ends of the shaft 55 are levers 56 and 57. Pivoted to the lever 56 is a link 58 operatively connected with the friction wheel 54 for sliding the same on the shaft 28. On the shaft 51 is a belt pulley 59 and on the shaft 15 is a belt pulley 60 in line with the pulley 59. A plate or rod 61 travels on the pulleys 59 and 60. On the shaft 28 is a wheel 62. Pivoted to the wheels 62, off center thereof, is a pitman 63 which extends upwardly and laterally in the machine and is pivoted to the bar 22.

At each side of the platform 16, near the upper end thereof, is an upwardly extending member 64. Secured to the arm 64 and spaced above the platform 16 is a bar 65. The arms 64 are provided with a series of openings 66 to selectively receive the bolts 67 by which the bars 65 are secured to said members 64.

I provide a substantially elliptical frame 68 made of channel bar and arranged adjacent to the upper ends of the vertical sides of the buckets 35. Upon each of said vertical sides are two rollers 69 which travel in the channel bar frame 68 for holding the buckets in proper position.

In the practical operation of my improved machine, the pulley 29 is pivotally connected with a suitable source of power. When the shaft 28 is rotated, movement is transmitted through the wheels 54, the disk 53, the pulleys 59 and 60 and the belt 61 to the shaft 15 and the conveyer 12. Material in the receptacle 11 is carried to the upper end of the conveyer 12 and discharged upon the platform 16. By means of the wheel 62, the pitmen 63, the bar 22 and the arms 18, a lateral vibrating movement is imparted to the upper end of the platform 16. Corn which has been removed from the stalks but on which the husks remain is discharged upon the upper end of the platform 16. On account of the arrangement of the bar 65, the ears must rest flat on the platform 16 in order to pass under said bar. On account of the fact that the butt end of the ear is the heavier end the vibratory motion of the platform 16 causes the ears to slide toward the lower end of said platform with their heavy ends downwardly.

The operator may stand by the side of the machine and assist in arranging the ears as they pass downwardly over the platform 16 and between the lower ends of the side boards 24. The butts of the ears of corn slide over the upper ends of the buckets 35 and the ears drop into the receiving buckets. The lower ends of the buckets 35 are open and the heavy end of the ear rests upon the guide bars 36, as clearly shown in Fig. 6.

As the buckets pass along, ears are carried over the knife blade 44 and the butts are cut off and drop into the chute 47. If desired, two knives 44, as shown in Fig. 4, may be used, in which case, the second knife will make a second shave or cutting, thereby still further reducing the weight of the ear and removing more of the husk. As the buckets pass the delivery ends of the guide bars 36, the ears drop from the buckets upon the conveyer 48 by which they are carried rearwardly in the machine and discharged into the receptacle 52.

It will, of course, be seen that the chains 33 and 34 are operated from the sprockets on the shaft 28 and that the conveyer 48 is operated from the shaft 51, the disk 53, the friction wheel 54 and the shaft 28.

For accommodating the machine to ears of different weight and thickness the distance of the guide bars 36 from each other may be varied by loosening the nuts 42 and sliding the bolts 40 in the slots 43 in the brackets 38.

As has already been seen, the feeding may be partially regulated by regulating the position of the side boards 24. This may be done by removing the bolts 26 and placing them in different holes 27. The height of the bar 65 above the platform 16 may be varied by placing the bolt 67 in different holes 66. The rear end of the platform 16 may be elevated or lowered by removing the bolts 21 and placing them in different holes 20.

If, at any time, the corn should be elevated too rapidly to be properly fed from the platform 16 to the buckets, the operator may, by means of the levers 56 and 57, slide the friction wheel 54 toward the center of the disk 53 and thereby decrease the speed of the conveyer or elevator 12.

In actual practice, the operator standing on the right hand side of the machine, as shown in Fig. 1, may operate the lever 57 with his knee while guiding the corn with his hands.

Many of the advantages of my improved feeding device for corn husking machines may be seen from the foregoing description. It will of course be understood that the corn in the receptacle 52 may be fed to the husking rollers, as desired. It is well known that unless the corn is snapped close to the cob when it is removed from the stalk, it is much harder to complete the removal of the husks when the butts are left on the ear than when they are removed.

I have found that where my improved machine is used, it is comparatively easy to remove the remaining portion of the husk after the butts thereof are cut off. It will be seen that the corn may be fed into the buckets 35 very rapidly and a very large amount of corn may be trimmed by a single workman operating my improved machine.

On account of the method of operating the elevator 12 the supply of corn can be accurately regulated so that it may be fed to advantage without overcrowding the platform 16.

It will be understood that changes may be made in the details of the construction of my machine without departing from its essential features and it is my purpose by this application to cover any such changes which may be included within the scope of the appended claims.

I claim as my invention:

1. In a device of the class described, a traveling conveyer, a plurality of buckets mounted thereon and designed to receive ears of corn, said buckets being open at both ends, guide bars beneath a portion of the upper part of said traveling conveyer designed to support ears of corn contained in said buckets and a blade on said guide bars designed to cut off the lower ends of said ears.

2. In a device of the class described, a traveling conveyer, a plurality of buckets mounted thereon, open at both ends, a pair of parallel guide rods under a part of the upper portion of said conveyer, designed to support ears of corn in said buckets, a blade mounted on said bars and means for varying the distance of said bars from each other.

3. In a device of the class described, a traveling conveyer, a plurality of buckets mounted thereon, open at both ends, a pair of parallel guide bars mounted beneath the upper part of said conveyer and designed to support ears of corn contained in said buckets, a cutting blade mounted on said bars, and means for feeding ears of unhusked corn, butts downward, into said buckets.

Des Moines, Iowa, April 24, 1913.

ISAAC WOODRING.

Witnesses:
E. G. ENGELBRECHT,
J. H. MEYER.

---

Copies of this patent may be obtained for five cents each, by addressing the "Commissioner of Patents, Washington, D. C."